(12) United States Patent
Quere et al.

(10) Patent No.: US 10,845,616 B2
(45) Date of Patent: Nov. 24, 2020

(54) OPTICAL DEVICE ADAPTED FOR A WEARER

(71) Applicant: Essilor International, Charenton-le-Pont (FR)

(72) Inventors: Loic Quere, Charenton-le-Pont (FR); Eric Gacoin, Charenton-le-Pont (FR); Benoit Callier, Charenton-le-Pont (FR); Mathieu Meynen, Charenton-le-Pont (FR); Alexis Raposo, Charenton-le-Pont (FR); Hasana Sadiki, Charenton-le-Pont (FR); Marc Reignault, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 103 days.

(21) Appl. No.: 15/741,035

(22) PCT Filed: Jun. 28, 2016

(86) PCT No.: PCT/EP2016/065011
§ 371 (c)(1),
(2) Date: Dec. 29, 2017

(87) PCT Pub. No.: WO2017/001402
PCT Pub. Date: Jan. 5, 2017

(65) Prior Publication Data
US 2018/0188555 A1    Jul. 5, 2018

(30) Foreign Application Priority Data
Jul. 2, 2015    (EP) .................................... 15306086

(51) Int. Cl.
*G02C 7/10* (2006.01)
*G02C 1/00* (2006.01)
(Continued)

(52) U.S. Cl.
CPC ........... *G02C 1/10* (2013.01); *G02B 27/0172* (2013.01); *G02B 27/0176* (2013.01);
(Continued)

(58) Field of Classification Search
CPC .. G02B 27/017; G02B 27/0179; G02B 27/01; G02C 7/081; G02C 7/083; G02C 7/088
(Continued)

(56) References Cited

U.S. PATENT DOCUMENTS

| 4,756,605 A * | 7/1988 | Okada ..................... G02C 7/083 349/13 |
|---|---|---|
| 5,080,475 A | 1/1992 | Ferron |
| 2013/0169922 A1 | 7/2013 | Austin |

FOREIGN PATENT DOCUMENTS

| JP | 2004-21078 A | 1/2004 |
|---|---|---|
| WO | WO 2006/098097 A1 | 9/2006 |
| WO | WO 2011/149364 A1 | 12/2011 |

OTHER PUBLICATIONS

International Search Report and Written Opinion dated Sep. 12, 2016 in PCT/EP2016/065011 filed Jun. 28, 2016.

* cited by examiner

*Primary Examiner* — Hung X Dang
(74) *Attorney, Agent, or Firm* — Oblon, McClelland, Maier & Neustadt, L.L.P.

(57) ABSTRACT

An optical device for a wearer including an optical system with an active function configured to be mounted into a frame, a wafer comprising an internal face facing the optical system, the wafer being configured to be mounted into the frame, and holding means configured to maintain the optical system and the wafer in the frame without contact at least between a part of the optical system and the internal face of the wafer.

14 Claims, 3 Drawing Sheets

Figure 1:
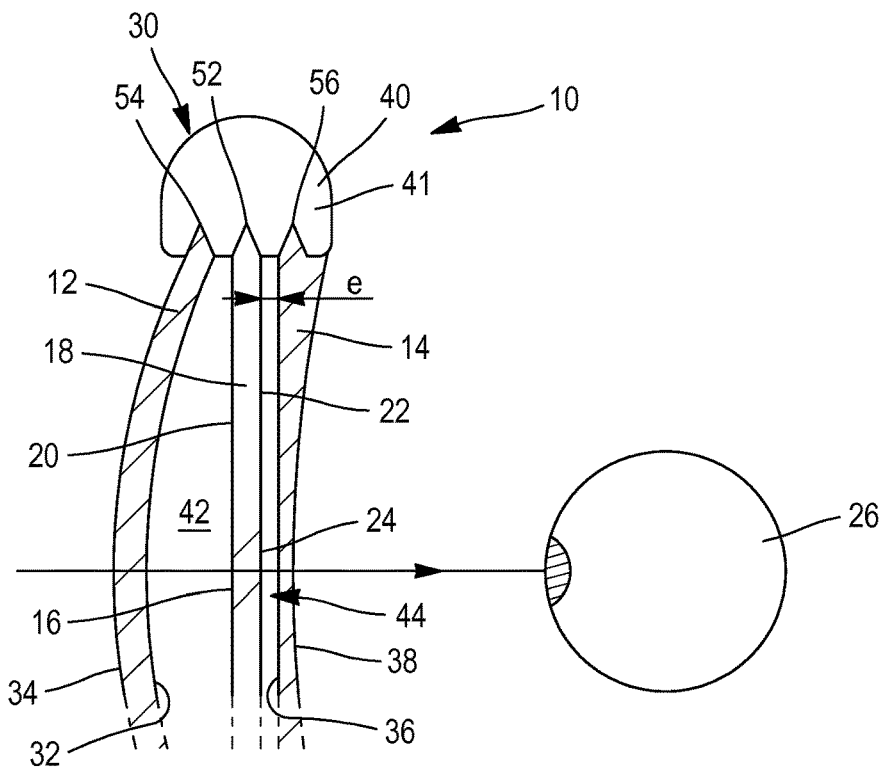

(51) Int. Cl.
    *G02B 27/01*     (2006.01)
    *G02C 7/08*     (2006.01)
    *G02C 11/00*     (2006.01)
    *G02C 13/00*     (2006.01)
    *G02C 1/08*     (2006.01)

(52) U.S. Cl.
    CPC .............. *G02C 7/086* (2013.01); *G02C 11/10* (2013.01); *G02C 13/001* (2013.01); *G02B 2027/0178* (2013.01); *G02C 1/08* (2013.01)

(58) Field of Classification Search
    USPC .............................. 351/44, 49, 158; 359/265
    See application file for complete search history.

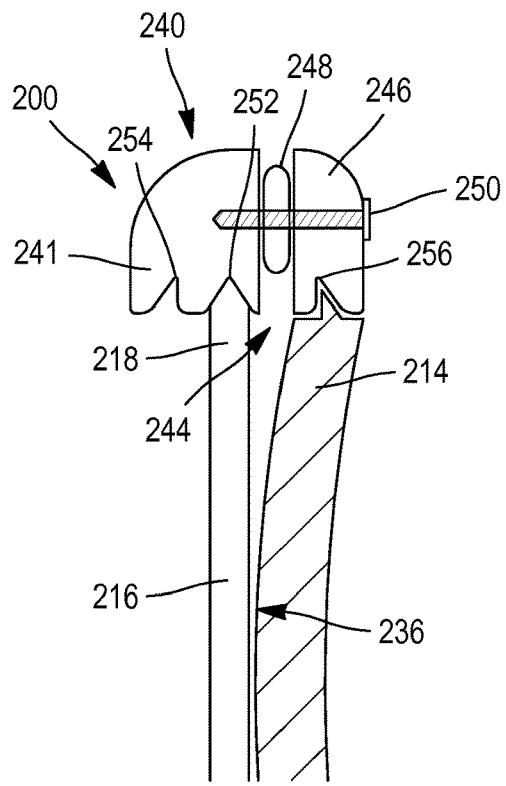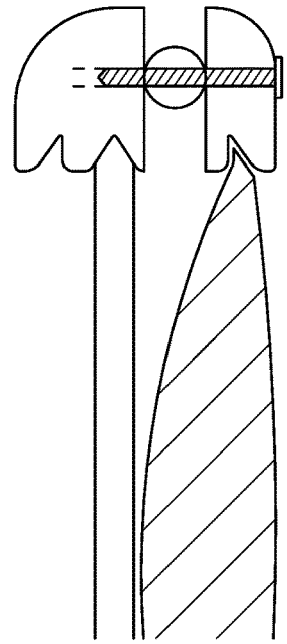
FIG. 3A  FIG. 3B
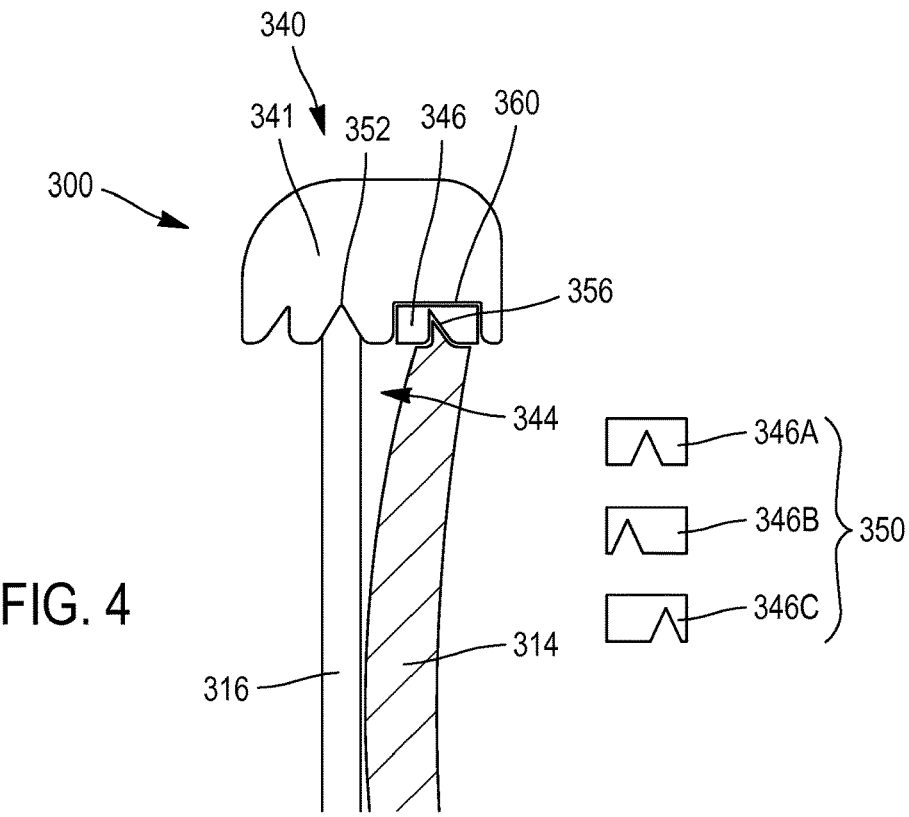
FIG. 4

OPTICAL DEVICE ADAPTED FOR A WEARER

The invention relates to an optical device adapted to a wearer and more particularly to such optical device comprising an optical system with an active function, for example a display system comprising a light conducting element used in head-mounted display systems. The invention may also apply to other optical systems having an active function, for example electrochromics cells used to adjust the light intensity using variable light transmission, and more generally to any light conducting element that may change light property in an active way.

A head-mounted system is an electro-optical device worn on the head by a wearer. Usually such system is electronically controlled so as to switch between different stages or to display information to the wearer. A head mounted system usually presents like a spectacle frame with electronically controlled spectacle lenses.

The present invention is concerned with head-mounted system used according to various usage pattern such as non immersive head-mounted system that allow the wearer to interact with their environment while using the head-mounted system or immersive head-mounted system that cuts off the field of outside view.

More particularly, the present invention is concerned with head-mounted system comprising a see-around or see-through mechanism. Head-mounted see-through display systems are capable of superimposing information, for example computer generated information, over the real-world view. Such head-mounted see-through display systems are used in particular for realizing augmented reality.

There is a need to provide an optical device adapted to a wearer or a group of wearers, in particular adapted to their lifestyle, their visual needs and/or their requests in a simply manner, with a modular approach if necessary and preferably in a late step of the manufacturing of the optical device in order to limit the unit production cost.

In the example of a head mounted display systems, there is a need to customize such system to the wearer's viewing ability since the wearer sees the real-world through it. Then the wearer need corrective ophthalmic lenses to see the real world correctly, the head mounted see-trough system should be adapted to such requirements.

Therefore, there is a need to provide an optical device, for example a head-mounted see-trough system, adapted to a wearer and in particular to a wearer's prescription.

The wearer's prescription is a set of optical characteristics of optical power, of astigmatism and, where relevant, of addition, determined by an ophthalmologist in order to correct the vision defects of the wearer, for example by means of a lens positioned in front of his eye. For example, the prescription for a progressive addition lens comprises values of optical power and of astigmatism at the distance-vision point and, where appropriate, an addition value.

Therefore, it is an object of the present invention to provide an optical device comprising an optical system with an active function and adapted to a wearer visual needs, whether it is wearer's prescription or other visual needs such a light attenuation, color perception, glare protection, visual comfort improvement.

To this end, the invention proposes an optical device adapted for a wearer comprising:
an optical system with an active function configured to be mounted into a frame,
a first wafer comprising an internal face facing the optical system, the wafer being configured to be mounted into the frame, and
a holding mean configured to maintain the optical system and the wafer in the frame without contact at least between a part of the optical system and the internal face of the first wafer.

Without contact means that there is no contact between the internal surface of the wafer and the light conducting element, except possibly at the edges or on limited peripheral regions of the wafer and/or the light conducting element which are not involved in guiding the light of the virtual image displayed by the display system.

Advantageously, the optical device according to the invention allows providing a customized optical device while using generic optical system, i.e. not adapted to the specific need of each individual wearer. The optical device thus provided is compact and can be easily assembled, limiting thus the unit production cost.

Advantageously, the wafer of the optical device according to the invention can be customized for the specific need of each wearer as for ophthalmic lenses. Moreover, the wafer can be removable from the optical device; in this case the wafer can easily be replaced by another wafer having an external surface customized according to an updated wearer data, such as wearer's prescription or more generally wearer's visual needs. Replacing the wafer is thus particularly easy as it does not require complex encapsulation process of the light conducting element in a lens.

Furthermore, thanks to the gap between the light conducting element and the wafer, when the light conducting element is used for displaying images in a head-mounted see-trough display system, at least the face of the light conducting element facing the wafer does not need an optical isolation coating which is particularly yet difficult to be provided.

According to further embodiments of the optical device according to the invention which can be considered alone or in combination:
the optical system with an active function is a system comprising a light conducting element, or is an optical system comprising an active light modulating device;
the optical element comprises a photochromic system, an electrochromic system, an electrofocus system and/or a system comprising an active Fresnel element;
the holding mean comprises a block arranged between a peripheral area of the first wafer and a peripheral area of the optical system, the width and/or the geometry of the block being configured to ensure a gap at least between the optical system and the first wafer;
the holding mean is embedded in the frame and comprises a rim having a first holding geometry and a second holding geometry configured to maintain respectively the external periphery of the optical system, and the external periphery of the first wafer, the external periphery of the optical system and the external periphery of the first wafer having respectively a corresponding complementary holding geometry configured to cooperate respectively with the first and the second holding geometries, the first and the second holding geometries being configured to ensure a gap at least between the optical system and the first wafer;
the frame comprises an upper part and a bottom part configured to be assembled fixedly, the upper part comprising a rim having a first holding geometry and a second holding geometry configured to maintain respectively the upper external periphery of the optical system and the upper external periphery of the first wafer and the bottom part comprising another rim having a first holding geometry and a second holding geometry configured to maintain respectively the bottom external periphery of the optical system and the bottom external periphery of the first wafer, the first and the second holding geometries of the rims being configured to ensure the gap at least between the optical system and the first wafer;

the holding mean comprises an elastic ring arranged between a peripheral area of the first wafer and a peripheral area of the optical system, the width of the elastic ring being configured to ensure a gap at least between the optical system and the first wafer;

the holding mean is made in flexible and deformable material;

the optical device comprises sealing means arranged between a peripheral area of the optical system and a peripheral area of the internal face of the first wafer;

the wafer and the optical system are each configured to be edged around a contour to the dimensions of the frame and wherein the holding mean is arranged on the majority of the contour and preferably on the entire contour;

the optical system with an active function is a display system comprising a light conducting element and a display source configured to emit a supplementary light into the light conducting element, the first wafer is arranged between the light conducting element and an eye of the wearer towards which the supplementary light is configured to be transmitted, the first wafer comprises an external face opposed to the face facing the light conducting element having a nick arranged in the periphery of the first wafer and whose shape is adapted to the shape of the display source such that the supplementary light emitted by the display source enters in the light conducting element without being transmitted by the first wafer;

the gap formed at least between the optical system and the first wafer is filled with air;

the optical device further comprises a second wafer arranged such that the optical system is placed between both first and second wafers and wherein the optical system comprises an optical isolation layer arranged on the face facing the second wafer, the optical isolation layer being in close contact with the second wafer.

Another object of the invention is a frame configured to receive an optical system with an active function and a first wafer comprising an internal face facing the optical system, the frame comprising a holding mean configured to maintain the optical system and the first wafer in the frame without contact at least between a part of the optical system and the internal face of the first wafer.

Another object of the invention is a method for assembling an optical device according to the invention, the method comprising at least:
  a step for providing the frame, the optical system and the first wafer,
  a holding mean providing step wherein the holding mean is provided,
  an assembling step wherein the transparent substrate and the first wafer are assembled into the frame with the holding mean by ensuring a gap at least between the optical system and the internal face of the first wafer.

According to further embodiments of the method for assembling an optical device according to the invention which can be considered alone or in combination:

the holding mean providing step comprises:
  a set of blocks providing step, wherein a set of blocks is provided, each block of the set of blocks having a different width and/or geometry; and
  a selecting step wherein a block is selected among the set of blocks to ensure the gap when the block is arranged between a peripheral area of the first wafer and a peripheral area of the optical system, and
the assembling step comprises a step for arranging the selected block between the peripheral area of the first wafer and the peripheral area of the optical system;

the holding mean providing step comprises:
  providing the holding mean comprising a rim having a first holding geometry and a cavity, the first holding geometry being configured to cooperate with a corresponding complementary holding geometry arranged on the external periphery of the optical system for maintaining the optical system into the frame,
  a set of blocks providing step, wherein a set of blocks is provided, each block of the set of blocks being configured to be introduced fixedly in the cavity and comprising a second holding geometry configured to cooperate with a corresponding complementary holding geometry arranged on the external periphery of the first wafer for maintaining the first wafer into the frame, the second holding geometry being arranged at a different position in each block of the set of blocks, and
  a selecting step wherein a block is selected among the set of blocks to ensure the gap when the optical device is assembled, and
the assembling step further comprises a step for arranging the selected block into the cavity of the holding mean;

the holding mean providing step comprises a step for providing an elastic ring configured to be arranged between a peripheral area of the wafer and a peripheral area of the optical system and a compression mean configured to compress the elastic ring to vary its thickness, and
the assembling step further comprises a compression step wherein the thickness of the elastic ring is adjusted by the compression mean to ensure the gap between the optical system and the internal face of the first wafer.

Figure 2:
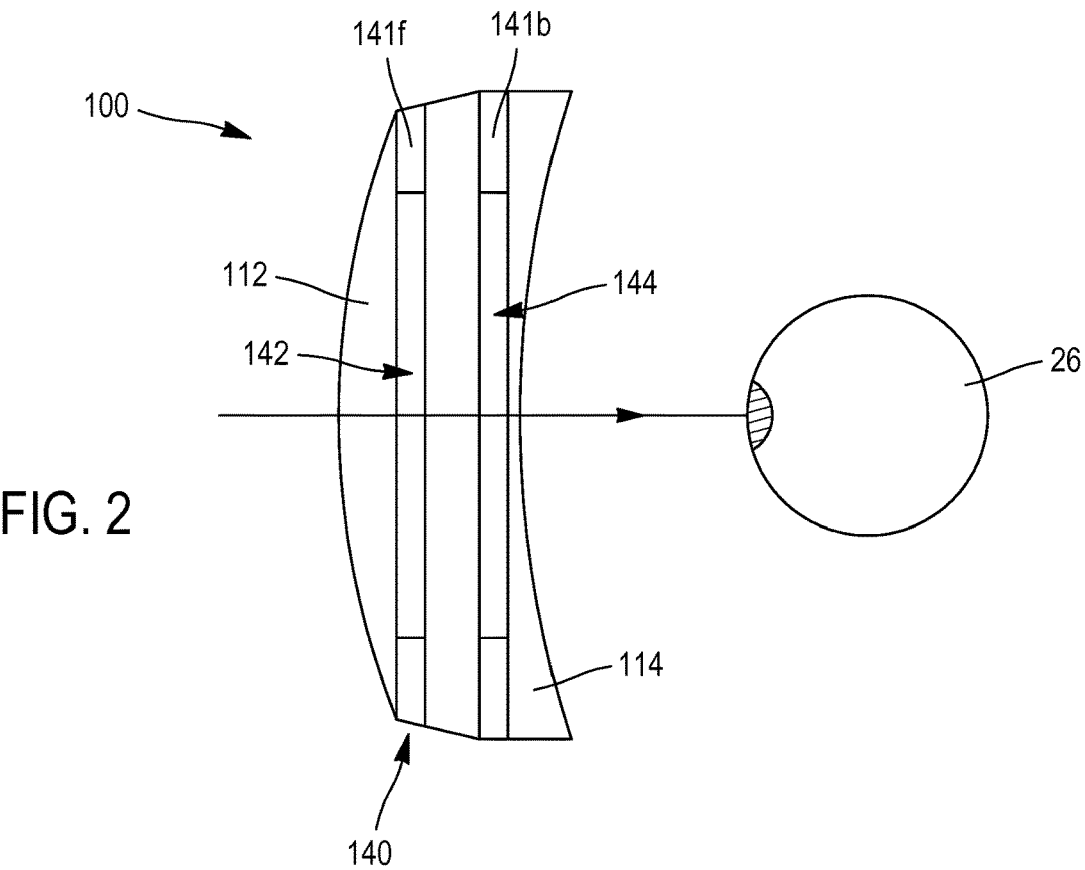
Figure 5A:
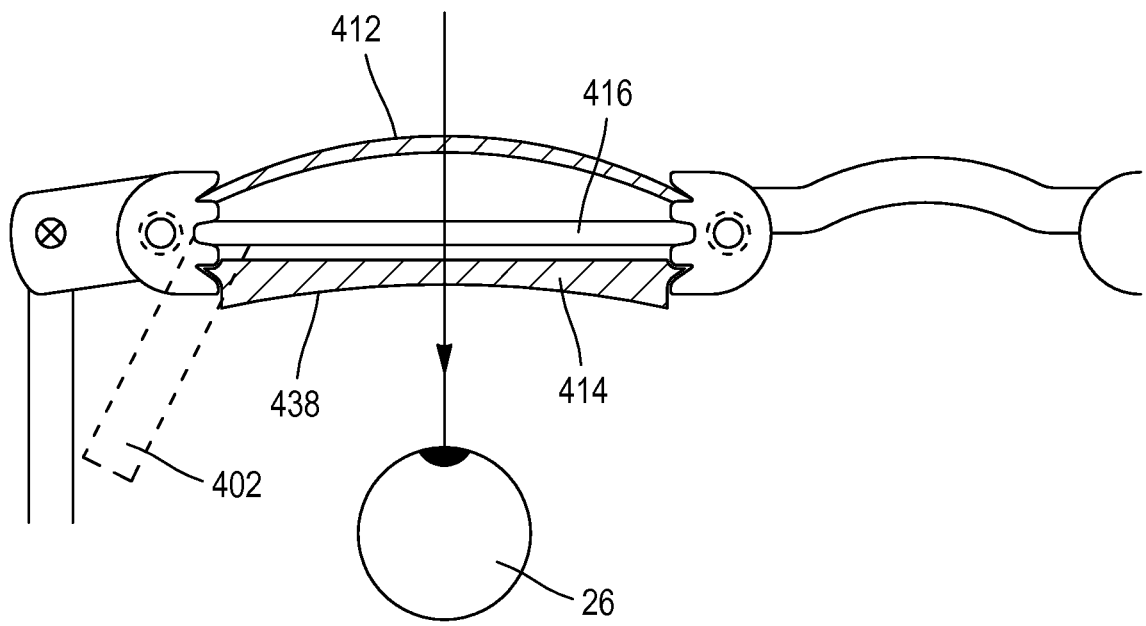
Figure 5B:
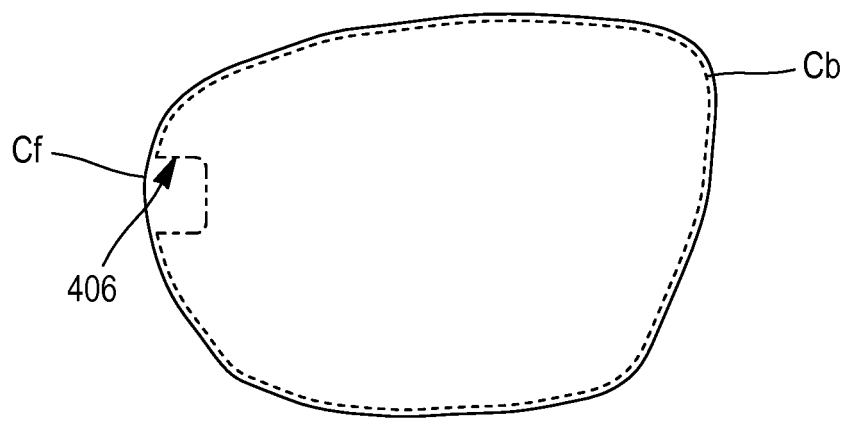

Non limiting embodiments of the invention will now be described, by way of example only, and with reference to the following drawings in which:

FIG. 1 is a partial sectional view of an optical device according to a first embodiment of the invention, FIG. 2 represents a sectional view of a second embodiment of an optical device according the invention, FIGS. 3A and 3B illustrate a partial sectional view of an optical device according to a third embodiment of the invention, FIG. 4 is a partial sectional view of an optical device according to a fourth embodiment of the invention, and FIGS. 5A and 5B illustrate a fifth embodiment of an optical device according to the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

The invention relates to an optical device adapted for a wearer comprising at least an optical system with an active function configured to be mounted into a frame, a first wafer and a holding mean.

The optical system with an active function can be a system comprising a light conducting element, or an optical system comprising an active light modulating device.

The system comprising a light conducting element may be a display device and/or any other emitting system such as a light treatment apparatus useful for treating, in a non limitative way, mood disorders, circadian rhythms disorders, sleep disorders, jet lag.

The active light modulating device can be configured to modulate the amplitude or the phase of the light. The optical system can be a photochromic system, an electrochromic system, an electrofocus system and/or a system comprising an active Fresnel element.

Subsequently, a preferred embodiment will be detailed in which the optical system with an active function is a display system comprising a light conducting element. The display system is arranged to display information, generally computer generated information, towards at least one eye of the wearer. For example, the display system can be arranged to surimpose information over the real world view. With such device, the viewer's image of the world is augmented with overlaying information.

The display system comprises a display source (not illustrated), a collimating source (not illustrated) and a light conducting element. The light conducting element is configured to trap the supplementary light and output the supplementary light through an exit face of said light conducting element towards an eye of the wearer. For example, the light conducting element can be a light-guide optical element (LOE).

Such display system allows an image source to be imaged to infinity or not and reflected into the eye of the wearer.

In one embodiment, the light conducting element comprises a transparent substrate. Such transparent substrate has a front optical face and a back optical face, which are preferably both plan faces. The exit face of said light conducting element through which the supplementary light outputs towards an eye of the wearer can be a part of or the entire back optical face of the transparent substrate.

The light conducting element can further comprise or not an optical isolation layer arranged at least on the exit face of the light conducting element through which the supplementary light is configured to output towards the eye of the wearer. Such optical isolation layer is configured to enable propagation of light beam by a set of reflections within the light conducting element to the exit face, at least in front of the wearer's pupil, without too much loss of brightness and image quality.

Nevertheless, in a preferred embodiment of the invention, the light conducting element is devoid of such isolating layer at least on the exit face.

Furthermore, the light conducting element is configured to be mounted into a frame.

The first wafer comprises an internal face facing the light conducting element and is configured to be mounted into said frame.

Moreover, the holding mean is configured to maintain the transparent substrate and the first wafer in the frame without contact between the transparent substrate and the internal face of the wafer, i.e. such that there is a gap between at least the exit face of the light conducting element and the internal surface of the first wafer.

Advantageously, the holding mean comprises a block arranged between a peripheral area of the first wafer and a peripheral area of the transparent substrate such that the width and/or the geometry of the block is configured to ensure the gap at least between the light conducting element and the first wafer.

Preferably, the gap is filled with air. According to a variant, the gap can be filled with another material having a refractive index lower than the refractive index of the light conducting element. A large difference between the refractive index being preferable.

Furthermore, the optical device comprises preferably sealing means arranged between the peripheral area of the transparent substrate and the peripheral area of the internal face of the first wafer ensuring the water and/or air and/or dust tightness of the gap of the optical device.

Advantageously, the holding mean is made in flexible and deformable material in order to ensure an easy assembly of the optical device according to the invention. Indeed, such a feature allows to limit the forces/stresses applied on the wafer and/or the light conducting element when they are rimed into the frame.

In particular, wafers being generally thin and flexible, the risk of stress and/or deformation, for example due to thermal expansion and moisture, is important and this can lead to contact between the wafer and the light conducting element, generating virtual image degradations and aesthetic degradations.

Furthermore, such a flexible and deformable material can easily absorb the differences between the perimeters of the wafer and the light conducting element. Indeed, in the case of a rigid rim, a difference about several $\frac{1}{10}$ mm can impact the resilience of the wafer and/or the light conducting element into the frame in case of small perimeters or otherwise impose strong constraints on the wafer and/or the light conducting element in case of large perimeters.

Preferably, the first wafer and the light conducting element (or more particularly the transparent substrate) are each configured to be edged around a contour to the dimensions of the frame. Furthermore, the holding mean is arranged on the majority of the contour and preferably on the entire contour. Advantageously, such configuration ensures a good water and dust tightness.

In order to more facility the assembling of the optical device, at least a majority of the contour is comprised in a plan to ensure the sealing (water/air) in a particularly simple manner allowing the support of the contour of the wafer, which is plane on at least a majority of, and preferably the entire contour of the light conducting element, preferably via the transparent substrate. Another advantage is the ability to perform a simple seal, such a flat gasket.

Moreover, to ensure a more robust sealing between the first wafer and the light conducting element, preferably via the transparent substrate, the internal face of the first wafer comprises a peripheral area which is comprised in the same plan as the contour. Furthermore, the optical device can further comprise a second wafer arranged such that the light conducting element is placed at least partially between first and second wafers. In this case, one of the first and second wafers, which is furthest from the eye of the wearer, is called front wafer and the other, which is the closest to the eye, is called back wafer.

According to an embodiment of an optical device, the second wafer, for example the front wafer, can be in close contact with the light conducting element. In such case, the light conducting element preferably comprises an optical isolation layer arranged on the front face facing the front wafer. In this case, the isolation layer is in close contact with the front wafer. For example, the front wafer can be glued on the isolation layer and the light conducting element.

In this embodiment, the holding mean is configured such that there is a gap between at least the exit face of the light conducting element and the internal surface of the back wafer, and more particularly its internal surface.

Moreover, the back wafer and/or the front wafer may be configured to present several functions that may improve optical or/and mechanical properties of the optical system.

The functions may include one or more functions selected from the group comprising: a solar protection function, a polarizing function, an anti fog function, a hard coat function (abrasion and/or scratch-resistant coating and/or an impact-resistant coating), a top coat function, anti-smudge function, an anti reflective function, an interferential layer, an anti-static function, a tinted function, a filter function, a protective function, and any combination thereof In one embodiment, the back wafer and/or the front wafer may have a protective function of the optical system and especially of the light conducting element.

In another embodiment, non exclusive of the first one, the back wafer and/or the front wafer may be configured to ensure a filter function and/or to provide a corrective optical function to the wearer.

The back wafer and/or the front wafer are customized according to the wearer data. For example, the wearer data comprises the wearer prescription. The corrective optical function to be provided to the wearer is determined and at least one of the front and the back faces of the optical device is customized so as to provide such corrective optical function. The front and the back faces of the optical device are respectively the front surface of the front wafer and the back surface of the back wafer.

The wearer's prescription is a set of optical characteristics of optical power, of astigmatism and, where relevant, of addition, determined by an ophthalmologist in order to compensate/correct the vision defects of the wearer, for example by means of a lens positioned in front of his eye.

In one example, the wearer's prescription may be the prescription of an ametropic or emmetropic wearer.

Advantageously, only the back face of the optical device, i.e. the back surface of the back wafer is customized according to the wearer data. Indeed, if the back wafer is easily removable from the optical device, the back wafer can easily be replaced by another back wafer configured to ensure a gap between at least the exit face of the light conducting element and the internal surface of the other back wafer and having a "new" back surface different from the "old" back surface of the previous back wafer. The "new" back wafer can thus be customized according to an updated wearer data, if the wearer prescription has varied. Replacing the back wafer is particularly easy as it does not require complex encapsulation process of the light conducting element in the wafer and the light conducting element can be isolated only on the face in contact with the front wafer.

Thereafter, "a wafer according to the invention" means a wafer comprising an internal face facing the optical system with an active function and arranged such that there is a gap, preferably filled with air, between the internal face and at least a part of the optical system thanks to the holding mean.

Thus, the optical device can comprise a front "wafer according to the invention" and/or a back "wafer according to the invention". In other words, the holding mean is configured such that there is a "back" gap between at least a part of the optical system and the internal surface of the back wafer, and/or a "front" gap. between at least a part of the optical system and the internal surface of the front wafer.

According to a variant, the optical device can comprise a front and a back wafers, whose only one of the wafers is a "wafer according to the invention". According to another variant, the optical device can comprise only one wafer, front or back, which is a "wafer according to the invention".

Such an optical device is assembled according to a method according to the invention comprising at least a step for providing the frame, the light conducting element, preferably embedded in a transparent substrate, and "the wafer according to the invention".

Furthermore, the holding mean is provided during a holding mean providing step.

Then, during an assembling step, the light conducting element, preferably embedded in the transparent substrate, and the wafer are assembled into the frame with the holding mean by ensuring a gap at least between the light conducting element and the internal face of the wafer.

According to an embodiment, the frame comprises an upper part and a bottom part configured to be assembled fixedly.

The upper part comprises a rim having a first holding geometry and a second holding geometry configured to maintain respectively the upper external periphery of the substrate and the upper external periphery of the wafer.

Furthermore, the bottom part comprising another rim having a first holding geometry and a second holding geometry configured to maintain respectively the bottom external periphery of the substrate and the bottom external periphery of the wafer.

The first and the second holding geometries of the rims are configured and arranged to ensure the gap at least between the light conducting element and the wafer.

Of course, this configuration can be adapted in the case wherein the optical device comprises another wafer.

Such a configuration facilitates the assembly of the optical device according to the invention. Indeed, the or each wafer and the light conducting element are arranged in the bottom part of the frame, which guides them for their insertion in the rim of the upper part of the frame. Then the upper part is fixed to the bottom part.

Now different embodiments of an optical device according to the invention will now be described in details and more particularly different embodiments of the holding mean.

FIG. 1 illustrates a partial sectional view of an optical device 10 adapted for a wearer according to an embodiment of the invention. The optical device 10 comprises a display system and two wafers 12, 14.

As indicated hereinbefore, the display system comprises a light conducting element 16. In the example shown on FIG. 1, the light conducting element 16 comprises a transparent substrate 18 having a front optical face 20 and a back optical face 22, which are both plan faces. The back optical face 22 comprises an area corresponding to the exit face 24 of the light conducting element 16 through which the supplementary light is configured to output towards the eye 26 of the wearer.

The light conducting element 16 is configured to be mounted into a frame 30 via the transparent substrate 18.

The light conducting element 16 is arranged between both wafers 12, 14. The furthest wafer from the eye 26 is called front wafer 12 and the closest one to the eye 26 is called back wafer 14.

Furthermore, the transparent substrate 18, the front and back wafers 12, 14 are each configured to be mounted into the frame 30.

The front wafer 12 comprises an internal face 32 facing the light conducting element and an external face 34 opposed to the internal face 32. The back wafer 14 comprises an internal face 36 facing the light conducting element and an external face 38 opposed to the internal face 36.

The external face 34 of the front wafer 12 forms the front face of the optical device 10 and the external face 38 of the back wafer 14 forms the front face of the optical device 10.

The optical device 10 further comprises at least one holding mean 40 configured to maintain the light conducting element 16 via the transparent substrate 18 and each of the front and the back wafers 12, 14 in the frame 30 without contact between the light conducting element 16 and each of the wafers 12, 14. Such configuration ensures a front gap 42 and a back gap 44 between the light conducting element 16 and respectively the front wafer 12 and the back wafer 14. More precisely, the front gap 42 is arranged between at least the light conducting element 16 and the internal surface 32 of the front wafer 12 and the back gap 44 is arranged between at least the exit face 24 of the light conducting element 16 and the internal surface 36 of the back wafer 14.

In this embodiment, the holding mean 40 comprises a block 41 embedded in the frame. The block 41 comprises a rim having three holding geometries configured to maintain respectively the external periphery of the transparent substrate, the external periphery of the front wafer and the external periphery of the back wafer. The external periphery of the transparent substrate, the external periphery of the front wafer and the external periphery of the back wafer have respectively a corresponding complementary holding geometry configured to cooperate respectively with the three holding geometries. The three holding geometries are arranged and configured to ensure the front gap 42 and the back gap 44 between the light conducting element and the wafers.

More precisely, in the illustrated example, the rim comprises three grooves 52, 54, 56 configured to receive and maintain respectively the external periphery of the transparent substrate 18, the external periphery of the front wafer 12 and the external periphery of the back wafer 14. In this example, the three grooves 52, 54, 56 are each a V-shaped groove. Nevertheless, a U-shaped groove or other shaped groove can be envisaged. The external periphery of the transparent substrate, the external peripheries of the front and the back wafers have respectively a corresponding complementary bevel configured to cooperate respectively with the three grooves.

In this example, the relative position of the three grooves are fixed in the rim. Thus, the distance between the central groove 52 for the transparent substrate 18 and the "back" groove 56 for the back wafer 14 is determined and minimized such that whatever the internal curvature of the internal face 36 of the back wafer 14, there is no contact between the internal face 36 of the back wafer and at least the exit face 24 of the light conducting element 16 while ensuring a minimized thickness of the optical device.

In this example, the front wafer is also a wafer "according to the invention", thus the distance between the central groove 52 for the transparent substrate 18 and the "front" groove 54 for the front wafer 12 is determined and minimized such that whatever the internal curvature of the internal face 32 of the front wafer 12, there is no contact between the internal face 32 and at least the light conducting element 16 while ensuring a minimized thickness of the optical device.

A second embodiment of a holding mean 140 of an optical device 100 according to the invention is illustrated on FIG. 2.

In this embodiment, the holding mean comprises two blocks 141-f, 141-b forming two struts.

One block 141-f, "the front block", is arranged between a peripheral area of the front wafer 112 and a peripheral area of the transparent substrate 118 embedding at least partly the light conducting element 116. The width and/or the geometry of the front block is configured to ensure a gap 142 at least between the light conducting element and the front wafer.

The other block 141-b, "the back block", is arranged between a peripheral area of the back wafer 114 and a peripheral area of the transparent substrate 118. The width and/or the geometry of the back block is configured to ensure a gap 144 at least between the light conducting element and the back wafer.

For example, the front and the back blocks 141-f, 141-b have each an annular geometry.

Preferably, the width of the or each block is about ²⁄₁₀ mm ensuring the gap between the or each wafer according to the invention and the light conducting element.

For example, the block can be formed by an adhesive film having the adapted width and/or geometry.

According to another example as illustrated on FIGS. 3A and 3B, the block can be formed by an elastic ring, for example an elastomer seal, having the adapted width and/or geometry. Such an elastomer seal can be advantageously used in the case wherein the internal face of the wafer according to the invention and the face of the light conducting element facing the wafer comprises both a plan peripheral area ensuring the gap between the light conducting element and the wafer and a robust sealing between the wafer and the light conducting element. Advantageously, the width of the elastomer seal can be optimized and adjusted such that there is no contact between the internal face and at least the light conducting element while ensuring a minimized thickness of the optical device.

The or each block can be formed integrally with the frame.

Alternatively, the or each block are fixed to the corresponding wafer and the light conducting element are fixed by adhesive or by screwing through the blocks and the wafer and the light conducting element, of course in an area not used by the display system.

Advantageously, in the case wherein the fixation is made by screwing through the blocks and the wafer and the light conducting element, the blocks and/or the wafers can be easily removable in order to replace at least one wafer by a "new" wafer, for example if the wafer is no longer adapted to the wearer as described hereinbefore and if necessary, to replace the corresponding block by a "new" block having a width and/or a geometry configured to ensure a gap between the light conducting element and the "new" wafer.

For such second embodiment of an optical device, the holding mean providing step of the method for assembling an optical device according to the invention comprises:
 a set of blocks providing step during which a set of blocks is provided; each block of the set of blocks having a different width and/or geometry; and
 a selecting step during which a block is selected among the set of blocks to ensure the gap when the block is arranged between a peripheral area of the wafer and a peripheral area of the transparent substrate, and Furthermore, the assembling step comprises a step for arranging the selected block between the peripheral area of the wafer and the peripheral area of the light conducting element, preferably via the transparent substrate.

The embodiment of an optical device 200 according to the invention illustrated on FIGS. 3A and 3B will now be detailed. This embodiment combines features of the embodiment illustrated on FIG. 1 and others of the embodiment illustrated on FIG. 2.

More particularly, the holding mean 240 comprises a block 241 embedded in the frame. The block 241 comprises a rim having two holding geometries, here two grooves 252, 254 configured to maintain respectively the external periphery of the transparent substrate 218 and the external periphery of the front wafer (not illustrated). The external periphery of the transparent substrate and the external periphery of the front wafer have respectively a corresponding complementary holding geometry, here a corresponding bevel, configured to cooperate respectively with the two grooves 252, 254. The two grooves 252, 254 are arranged and configured to ensure the front gap between the light conducting element and the front wafer.

The relative position of the two grooves 252, 254 are fixed relative to each other in the rim. Thus, the distance between the central groove 252 for the transparent substrate 218 and the "front" groove 254 for the front wafer is determined and minimized such that whatever the internal curvature of the internal face of the front wafer, there is no contact between the internal face of the front wafer and at least the light conducting element while ensuring a minimized thickness of the optical device.

Moreover, the holding mean 240 comprises another block 246 comprising a rim having one holding geometry, here a "back" groove 256 configured to maintain the external periphery of the back wafer 214. The external periphery of the back wafer has respectively a corresponding complementary holding geometry, here a corresponding bevel, configured to cooperate respectively with the "back" groove 256.

The holding mean 240 further comprises an elastic ring 248, for example an elastomer seal, arranged between the block 241 and the other block 246.

Furthermore, the holding mean 240 comprises a screw 250 arranged and configured to assemble blocks and the elastic ring by screwing through the blocks and the elastic ring ensuring that no damage to the wafers and/or the light conducting element are caused by the screwing.

Preferably, the faces of the blocks between which the elastic ring 248 is arranged are plan.

Advantageously, the width of the elastic ring is optimized and adjusted thanks to the screw 250 such that there is a back gap 244 with no contact between the internal face 236 of the back wafer and at least the light conducting element 216 while ensuring a minimized thickness of the optical device 200. The relative position of the two grooves 252, 256 is thus adjusted.

Advantageously, only the back face of the optical device, i.e. the back surface of the back wafer is customized according to the wearer data. Indeed, the back wafer is easily removable from the optical device ensuring that the back wafer can easily be replaced by another back wafer configured to ensure a gap between at least the exit face of the light conducting element and the internal surface of the other back wafer and having a "new" back surface different from the "old" back surface of the previous back wafer as illustrated on FIGS. 3A and 3B. The "new" back wafer can thus be customized according to an updated wearer data, if the wearer prescription has varied. Replacing the back wafer is particularly easy as it does not require complex encapsulation process of the light conducting element with a wafer and the light conducting element can be isolated only on the face in contact with the front wafer.

On FIG. 3A, the wafer corresponds to a low base and thus has a low curvature. So, the elastic ring is highly compressed in order to minimize the gap but without contact between the light conducting element and the wafer.

On FIG. 3B, the wafer corresponds to a strong base and thus has a higher curvature. So, the elastic ring is less compressed in order to minimize the gap but without contact between the light conducting element and the wafer.

For such an embodiment of an optical device, the holding mean providing step of the method for assembling an optical device according to the invention comprises a step for providing the elastic ring, configured to be arranged between a peripheral area of the wafer and a peripheral area of the light conducting element, via the transparent substrate and a compression mean, for example the screw, configured to compress the elastic ring to vary its thickness.

Furthermore, the assembling step further comprises a compression step wherein the thickness of the elastic ring is adjusted by the compression mean to ensure the gap between the light conducting element and the internal face of the wafer.

FIG. 4 illustrates another embodiment of an optical device 300 allowing to replace easily a wafer according to the invention by another one and more particularly to adapt easily the relative distance between the light conducting element 316 and a "wafer according to the invention", here a back wafer 314.

More particularly, the holding mean 340 comprises a block 341 embedded in the frame and a removable block 346. More precisely, the holding mean 340 comprises a set 350 of removable blocks.

The block 341 comprises a rim having two holding geometries, here two grooves 352, 360 configured to maintain respectively the external periphery of the light conducting element 316 and the external periphery of the removable block 346. The external periphery of the light conducting element 316 has a corresponding complementary holding geometry, here a corresponding bevel, configured to cooperate respectively with the groove 352. The external periphery of the removable block 346 has respectively a corresponding complementary holding geometry configured to cooperate respectively with the corresponding groove 360.

Each removable block 346 of the set 350 of removable blocks comprises a rim having one holding geometry, here a groove 356 configured to maintain the external periphery of the back wafer 314.

Two removable blocks 346 of the set 350 differ from their holding geometries, for example from the shape or the position of the holding geometries configured to maintain the external periphery of the back wafer 314.

When two removable blocks 346 of the set 350 differ from the position of the holding geometry such that when arranged in the block 341, the distance between the central groove 352 for the light conducting element 316 and the "back" groove 356 of the removable block 346 for the back wafer is different for each removable blocks 346 of the set 350.

The removable block 346 configured to be arranged in the block 341 is chosen among the other removable blocks of the set 350 to ensure the back gap 344 between the light conducting element and the back wafer 314. Thus, the distance between the central groove 352 for the light conducting element 316 and the "back" groove 356 of the removable block 346 for the back wafer is determined and minimized such that whatever the internal curvature of the internal face of the back wafer, there is no contact between the internal face of the back wafer and at least the light conducting element while ensuring a minimized thickness of the optical device 300.

For such embodiment of an optical device, the holding mean providing step of the method for assembling this optical device according to the invention comprises:
- a set of blocks providing step during which a set of blocks is provided. As described hereinbefore, each block of the set of blocks is configured to be introduced fixedly in the cavity and comprises a second holding geometry configured to cooperate with a corresponding complementary holding geometry arranged on the external periphery of the wafer for maintaining the wafer into the frame, the second holding geometry being arranged at a different position in each block of the set of blocks, and
- a selecting step wherein a block is selected among the set of blocks to ensure the gap when the optical device is assembled.

Furthermore, the assembling step further comprises a step for arranging the selected block into the cavity of the holding mean.

Another embodiment of an optical device 400 according to the invention is shown on FIGS. 5A and 5B. This embodiment is compatible with the previous ones.

As indicated hereinbefore, the display element comprises a display source configured to emit a supplementary light into the light conducting element 416 via a collimating device.

For example, the display source is a micro-display projector. The assembly of the display source and the collimating device is often embedded in the temple of the eyeglasses or embedded in a single mechanical module 402 arranged close to the temple of the eyeglass as illustrated on FIG. 5A. Advantageously, the single mechanical module 402 can thus be assembled independently of the light conducting element 416, with fairly relaxed mechanical tolerances.

A "back wafer 414 according to the invention" is arranged between the light conducting element 416 and an eye 26 of the wearer towards which the supplementary light is configured to be transmitted.

Advantageously, the back wafer 414 comprises an external face 438 opposed to the face facing the light conducting element having a nick 406 arranged in the periphery of the back wafer as best illustrated on FIG. 5B. This figure illustrates the difference between the contour Cf (in continuous line) around which the front wafer 412 is edged and the contour Cb (in dotted line) around which the back wafer 414 is edged.

Advantageously, the shape of the nick 406 is adapted to the shape of the display source, and more particularly to the mechanical module 402, such that the supplementary light emitted by the display source enters in the light conducting element without being transmitted by the back wafer. Such a configuration allows to not interfere mechanically with the display source, and more particularly to the mechanical module 402, while limiting the entry of dust or water into the gap.

While preferred embodiments of the invention have been described above, it is to be understood that variations and modifications will be apparent to those skilled in the art without departing from the scope of the invention.

More particularly, preferred embodiments of the invention have been described when the optical system with an active function is a display system comprising a light conducting element.

As indicated hereinbefore, the optical system can comprise an active light modulating device, for example configured to modulate the intensity or the phase of the light. The optical system can be a photochromic system, an electrochromic system, or a system comprising an active Fresnel element.

For example, in the case of an electrochromic system, it can comprise at least an electrochromic cell, that may be driven to change light transmission. This electrochromic cell may contains chemical solution, having molecules with optical transmission depending on an electrical field applied to them. This cell can be flat, be also can have a curve shape, for example a spherical shape. For this electrochromic cell, the contact between the cell and the wafer may also be avoided for aesthetical reason, and the wafer may provide wearer visual needs such as prescription, since the electrochromic cell may not provide optical power, or incorrect optical power to the wearer.

Other optical systems with an active function may comprise optical element configured to change optical power, polarization, and/or tint light transmission in active way.

It is to be understood that variations and modifications to adapt the previous description to such other types of optical system will be apparent to those skilled in the art without departing from the scope of the invention.

The invention claimed is:

1. An optical device for a wearer comprising:
   - an optical system with an active function configured to be mounted into a frame;
   - a first wafer comprising an internal face facing the optical system, the first wafer being configured to be mounted into the frame; and
   - holding means configured to maintain the optical system and the wafer in the frame without contact at least between a part of the optical system and the internal face of the wafer,
   - wherein the holding means is embedded in the frame and comprises a rim having a first holding geometry and a second holding geometry configured to maintain respectively the external periphery of the optical system and the external periphery of the first wafer, the external periphery of the optical system and the external periphery of the first wafer having respectively a corresponding complementary holding geometry configured to cooperate respectively with the first and the second holding geometries, the first and the second holding geometries being configured to ensure a gap at least between the part of the optical system and the first wafer.

2. The optical device according to claim 1, wherein the optical system with an active function is a system comprising a light conducting element, or is an optical system comprising an active light modulating device.

3. The optical device according to claim 1, wherein the holding means comprises a block arranged between a peripheral area of the first wafer and a peripheral area of the optical system, the width and/or the geometry of the block being configured to ensure a gap at least between the part of the optical system and the first wafer.

4. The optical device according to claim 1, wherein the frame comprises an upper part and a bottom part configured to be assembled fixedly, the upper part comprising a rim having a first holding geometry and a second holding geometry configured to maintain respectively the upper external periphery of the optical system and the upper external periphery of the first wafer and the bottom part comprising another rim having a first holding geometry and a second holding geometry configured to maintain respectively the bottom external periphery of the optical system and the bottom external periphery of the first wafer, the first and the second holding geometries of the rims being configured to ensure the gap at least between the part of the optical system and the first wafer.

5. The optical device according to claim 1, wherein the holding means comprises an elastic ring arranged between a peripheral area of the wafer and a peripheral area of the optical system, the width of the elastic ring being configured to ensure a gap at least between the part of the optical system and the first wafer.

6. The optical device according to claim 1, wherein the optical device comprises sealing means arranged between a peripheral area of the optical system and a peripheral area of the internal face of the first wafer.

7. The optical device according to claim 1, wherein the holding means is made in flexible and deformable material.

8. The optical device according to claim 1, wherein the optical system with an active function is a display system comprising a light conducting element and a display source configured to emit a supplementary light into the light conducting element, the first wafer is arranged between the light conducting element and an eye of the wearer towards which the supplementary light is configured to be transmitted, the first wafer comprises an external face opposed to the face facing the light conducting element having a nick arranged in the periphery of the wafer and whose shape is adapted to the shape of the display source such that the supplementary light emitted by the display source enters in the light conducting element without being transmitted by the first wafer.

9. The optical device according to claim 1, wherein the gap formed at least between the optical system and the first wafer is filled with air.

10. A method for assembling an optical device for a wearer, including an optical system with an active function configured to be mounted into a frame, a first wafer comprising an internal face facing the optical system, the first wafer being configured to be mounted into the frame, and a holding means configured to maintain the optical system and the wafer in the frame without contact at least between a part of the optical system and the internal face of the wafer, wherein the holding means is embedded in the frame and comprises a rim having a first holding geometry and a second holding geometry configured to maintain respectively the external periphery of the optical system and the external periphery of the first wafer, the external periphery of the optical system and the external periphery of the first wafer having respectively a corresponding complementary holding geometry configured to cooperate respectively with the first and the second holding geometries, the first and the second holding geometries being configured to ensure a gap at least between the part of the optical system and the first wafer, the method comprising:
 providing the frame, the optical system and the first wafer;
 provided the holding means; and
 assembling the optical system and the first wafer into the frame with the holding means by ensuring a gap at least partly between a part of the optical system and the internal face of the first wafer.

11. The method for assembling the optical device according to claim 10, wherein:
 the providing the holding means further comprises:
 providing a set of blocks, each block of the set of blocks having a different width and/or geometry; and
 selecting a block among the set of blocks to ensure the gap when the block is arranged between a peripheral area of the wafer and a peripheral area of the optical system, and
 the assembling further comprises arranging the selected block between the peripheral area of the first wafer and the peripheral area of the optical system.

12. The method for assembling the optical device according to claim 11, wherein:
 the providing the holding means further comprises:
 providing the holding means comprising a rim having a first holding geometry and a cavity, the first holding geometry being configured to cooperate with a corresponding complementary holding geometry arranged on the external periphery of the optical system for maintaining the optical system into the frame;
 providing a set of blocks, each block of the set of blocks being configured to be introduced fixedly in the cavity and comprising a second holding geometry configured to cooperate with a corresponding complementary holding geometry arranged on the external periphery of the wafer for maintaining the wafer into the frame, the second holding geometry being arranged at a different position in each block of the set of blocks, and
 selecting a block among the set of blocks to ensure the gap when the optical device is assembled, and
 the assembling further comprises arranging the selected block into the cavity of the holding means.

13. The method for assembling the optical device according to claim 10, wherein:
 the providing the holding means further comprises providing an elastic ring configured to be arranged between a peripheral area of the wafer and a peripheral area of the optical system, and a compression means configured to compress the elastic ring to vary thickness, and
 the assembling further comprises adjusting the thickness of the elastic ring by the compression means to ensure the gap between the optical system and the internal face of the first wafer.

14. A frame configured to receive an optical system with an active function and a first wafer comprising an internal face facing the optical system, the frame comprising:
 holding means configured to maintain the optical system and the wafer in the frame without contact at least between a part of the optical system and the internal face of the first wafer, and
 wherein the holding means is embedded in the frame and comprises a rim having a first holding geometry and a second holding geometry configured to maintain respectively the external periphery of the optical system and the external periphery of the first wafer, the external periphery of the optical system and the external periphery of the first wafer having respectively a corresponding complementary holding geometry configured to cooperate respectively with the first and the second holding geometries, the first and the second holding geometries being configured to ensure a gap at least between the part of the optical system and the first wafer.

* * * * *